US012759411B2

(12) United States Patent
Cho et al.

(10) Patent No.: US 12,759,411 B2
(45) Date of Patent: Oct. 13, 2026

(54) BRAKING CONTROL METHOD FOR ELECTRIC VEHICLES

(71) Applicants: Hyundai Motor Company, Seoul (KR); Kia Corporation, Seoul (KR)

(72) Inventors: Jin Kyeom Cho, Suwon-Si (KR); Dong Hoon Lee, Suwon-Si (KR); Sun Woo Kim, Seoul (KR); Dong Hyeon Woo, Daegu (KR); Seok Cheon Jeon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 118 days.

(21) Appl. No.: 18/797,431

(22) Filed: Aug. 7, 2024

(65) Prior Publication Data

US 2025/0276581 A1 Sep. 4, 2025

(30) Foreign Application Priority Data

Feb. 29, 2024 (KR) ........................ 10-2024-0030038

(51) Int. Cl.
*B60L 7/26* (2006.01)
*B60L 15/20* (2006.01)
(Continued)

(52) U.S. Cl.
CPC ............. *B60L 7/26* (2013.01); *B60L 15/2009* (2013.01); *B60L 58/12* (2019.02); *B60T 1/10* (2013.01);
(Continued)

(58) Field of Classification Search
CPC .... B60L 15/2009; B60L 2260/22; B60L 7/26; B60W 30/18127; B60T 1/10
See application file for complete search history.

(56) References Cited

U.S. PATENT DOCUMENTS 5,511,859 A * 4/1996 Kade ..................... B60T 13/586 303/3
11,130,403 B1 * 9/2021 Woodland ................. B60T 1/10
(Continued)

FOREIGN PATENT DOCUMENTS

JP 2009029388 A * 2/2009
JP 2010004670 A * 1/2010
(Continued)

OTHER PUBLICATIONS

EPO machine translation of JP 2009-29388A (original JP document published Feb. 12, 2009) (Year: 2009).*

*Primary Examiner* — David A Testardi
(74) *Attorney, Agent, or Firm* — MORGAN, LEWIS & BOCKIUS LLP

(57) ABSTRACT

A braking control method for electric vehicles, involving a non-linear deceleration profile for enhanced automatic braking, includes generating the present profile by a control device, assessing the feasibility of motor-alone braking, and implementing braking based on the profile using only the motor when appropriate. Additionally, the control device evaluates if the motor speed stays within a predetermined range during a set time before the expected stop. If the speed is within the range, the vehicle is brought to a complete stop using only the motor. This approach aims to optimize energy efficiency and ensure safe braking performance.

14 Claims, 7 Drawing Sheets

(51) Int. Cl.
*B60L 58/12* (2019.01)
*B60T 1/10* (2006.01)

(52) U.S. Cl.
CPC ... *B60L 2240/421* (2013.01); *B60L 2240/423* (2013.01); *B60L 2240/425* (2013.01)

(56) References Cited

U.S. PATENT DOCUMENTS

| | | | | |
|---|---|---|---|---|
| 2002/0063000 | A1* | 5/2002 | Kojima | B60W 10/08<br>903/909 |
| 2011/0196560 | A1* | 8/2011 | Maini | B60L 7/18<br>701/22 |
| 2013/0297134 | A1* | 11/2013 | Saito | B60L 50/16<br>701/22 |
| 2014/0379190 | A1* | 12/2014 | Sawada | B60L 7/14<br>701/22 |
| 2015/0019058 | A1* | 1/2015 | Georgiev | B60L 58/12<br>701/22 |
| 2016/0167519 | A1* | 6/2016 | Luke | B60L 58/12<br>701/22 |
| 2018/0141441 | A1* | 5/2018 | Kim | B60T 8/321 |
| 2018/0215272 | A1* | 8/2018 | Vitullo | B60L 7/18 |
| 2018/0257491 | A1* | 9/2018 | Tomita | B60T 8/171 |
| 2019/0225087 | A1* | 7/2019 | Ernst | B60W 30/18127 |
| 2019/0359213 | A1* | 11/2019 | Huh | B60W 10/08 |
| 2021/0354693 | A1* | 11/2021 | Trofimov | B60L 15/2009 |
| 2023/0001928 | A1* | 1/2023 | Park | B60W 10/188 |
| 2023/0256956 | A1* | 8/2023 | Oguro | B60W 10/08<br>701/22 |
| 2023/0331092 | A1* | 10/2023 | Liu | B60L 15/2009 |
| 2023/0365002 | A1* | 11/2023 | Liu | B60L 15/2009 |
| 2024/0351448 | A1* | 10/2024 | Kamio | B60L 7/18 |
| 2025/0222780 | A1* | 7/2025 | Lv | B60L 7/26 |
| 2026/0109352 | A1* | 4/2026 | Alvarez Prado | B60W 10/02 |

FOREIGN PATENT DOCUMENTS

| | | | | | |
|---|---|---|---|---|---|
| JP | 2011097691 | A | * | 5/2011 | |
| JP | 2016028913 | A | * | 3/2016 | |
| JP | 2021070411 | A | * | 5/2021 | B60T 8/17555 |

* cited by examiner

BRAKING CONTROL METHOD FOR ELECTRIC VEHICLES

CROSS-REFERENCE TO RELATED APPLICATION

The present application claims priority to Korean Patent Application No. 10-2024-0030038, filed on Feb. 29, 2024, the entire contents of which is incorporated herein for all purposes by this reference.

BACKGROUND OF THE PRESENT DISCLOSURE

Field of the Present Disclosure

The present disclosure relates to braking of electric vehicles.

Description of Related Art

With the development of autonomous driving functions and driving assistance functions, recent vehicles not only automatically decelerate without a driver having to operate a brake pedal but also achieve a complete stop state.

Hereinafter, automatically decelerating and stopping a vehicle without a brake pedal operation of a driver will be referred to as "automatic braking".

Electric vehicles can implement automatic braking through regenerative braking of a motor, and when a vehicle approaches a stop state, a hydraulic brake is used to achieve a complete stop state.

However, when braking by a motor and braking using a hydraulic brake are connected as described above, longitudinal vibration of the vehicle may occur.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a braking control method for electric vehicles through which longitudinal vibration of an electric vehicle which may occur due to association of a braking operation with a hydraulic brake may be minimized during automatic braking of the electric vehicle to improve the braking quality of the vehicle and ultimately improve the marketability of the vehicle.

In accordance with an aspect of the present disclosure, the above and other objects may be accomplished by the provision of a braking control method for an electric vehicle, including a control device generating a non-linear deceleration profile for automatic braking, the control device determining whether motor-alone braking is possible, the control device performing braking of the vehicle according to the non-linear deceleration profile using a motor alone if motor-alone braking is possible, the control device determining whether a motor speed exceeds a predetermined reference range during a predetermined judgement time before an expected stopping time of the vehicle, and the control device completely stopping the vehicle using the motor alone upon concluding that the motor speed does not exceed the predetermined reference range.

The braking control method may further include the control device concluding that longitudinal vibration of the vehicle occurs and operating a hydraulic brake to completely stop the vehicle if the motor speed deviates from the predetermined reference range.

The non-linear deceleration profile may have at least two deceleration sections in which the vehicle is caused to decelerate at a rate higher than a predetermined normal reference deceleration at the beginning of braking the vehicle and to decelerate at a rate lower than the predetermined normal reference deceleration in later stages of the braking based on a linear deceleration profile for causing the vehicle to uniformly linearly decelerate from a current vehicle speed to the predetermined normal reference deceleration to stop.

The non-linear deceleration profile may include a first deceleration section in which the vehicle is caused to decelerate at a rate higher than the normal reference deceleration, and a second deceleration section in which the vehicle is caused to decelerate at a rate lower than the normal reference deceleration, the first deceleration section and the second deceleration section being connected to each other.

The control device may be configured to determine whether motor-alone braking is possible based on a motor temperature of the vehicle and state of charge (SOC) value of a battery of the vehicle.

The control device may be configured to determine that motor-alone braking is not possible upon concluding that the motor temperature exceeds a predetermined upper limit temperature or the SOC value of the high voltage battery exceeds a predetermined upper limit SoC.

The control device may operate the hydraulic brake along with the motor to perform braking of the vehicle according to the non-linear deceleration profile if motor-alone braking is not possible.

The control device may operate the hydraulic brake along with the motor at the beginning of braking the vehicle to decelerate the vehicle at a rate higher than the predetermined normal reference deceleration if motor-alone braking is not possible.

In accordance with another aspect of the present disclosure, there is provided a braking control device for an electric vehicle, including a profile generator configured to generate a non-linear deceleration profile for automatic braking, a braking element determination unit configured to determine whether braking of the vehicle according to the non-linear deceleration profile is able to be performed by motor-alone braking, depending on a temperature of a motor of the vehicle and SOC value of a battery of the vehicle, a hydraulic stop determination unit configured to determine whether to perform complete stopping of the vehicle, using a hydraulic brake, depending on whether longitudinal vibration of the vehicle occurs during a predetermined judgement time before an expected stopping time of the vehicle, and a motor torque controller and a hydraulic brake controller configured to perform braking of the vehicle according to the determination of the braking element determination unit and the hydraulic stop determination unit.

The profile generator may be configured to generate the non-linear deceleration profile including at least two deceleration sections in which the vehicle is caused to decelerate at a first rate higher than a predetermined normal reference deceleration at the beginning of braking the vehicle and to decelerate at a second rate lower than the predetermined normal reference deceleration in later stages of the braking based on a linear deceleration profile LP that causes the vehicle to uniformly linearly decelerate from a current vehicle speed to the predetermined normal reference deceleration to stop.

The non-linear deceleration profile may include a first deceleration section in which the vehicle is caused to decelerate at the first rate higher than the normal reference deceleration, and a second deceleration section in which the vehicle is caused to decelerate at the second rate lower than the normal reference deceleration, the first deceleration section and the second deceleration section being connected to each other.

The braking element determination unit may be configured to determine that motor-alone braking is not possible if the temperature of the motor exceeds a predetermined upper limit temperature or the SOC value of the battery exceeds a predetermined upper limit SOC value and to determine that motor-alone braking is possible if the temperature of the motor is equal to or lower than the upper limit temperature and the SOC value of the battery is less than or equal to the upper limit SoC.

The motor torque controller may be configured to perform braking of the vehicle according to the non-linear deceleration profile only with the motor when the braking element determination unit determines that motor-alone braking is possible.

The hydraulic brake controller may be configured to control the hydraulic brake in addition to the braking using the motor by the motor torque controller to achieve braking of the vehicle according to the non-linear deceleration profile when the braking element determination unit determines that motor-alone braking is not possible.

The hydraulic brake controller may be configured to operate the hydraulic brake at the beginning of braking the vehicle to decelerate the vehicle at a rate higher than the predetermined normal reference deceleration when the braking element determination unit determines that motor-alone braking is not possible.

The hydraulic stop determination unit may be configured to determine that longitudinal vibration of the vehicle occurs when the motor speed deviates from the predetermined reference range.

The hydraulic brake controller may be configured to operate the hydraulic brake to completely stop the vehicle when the hydraulic stop determination unit determines that the longitudinal vibration of the vehicle occurs.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
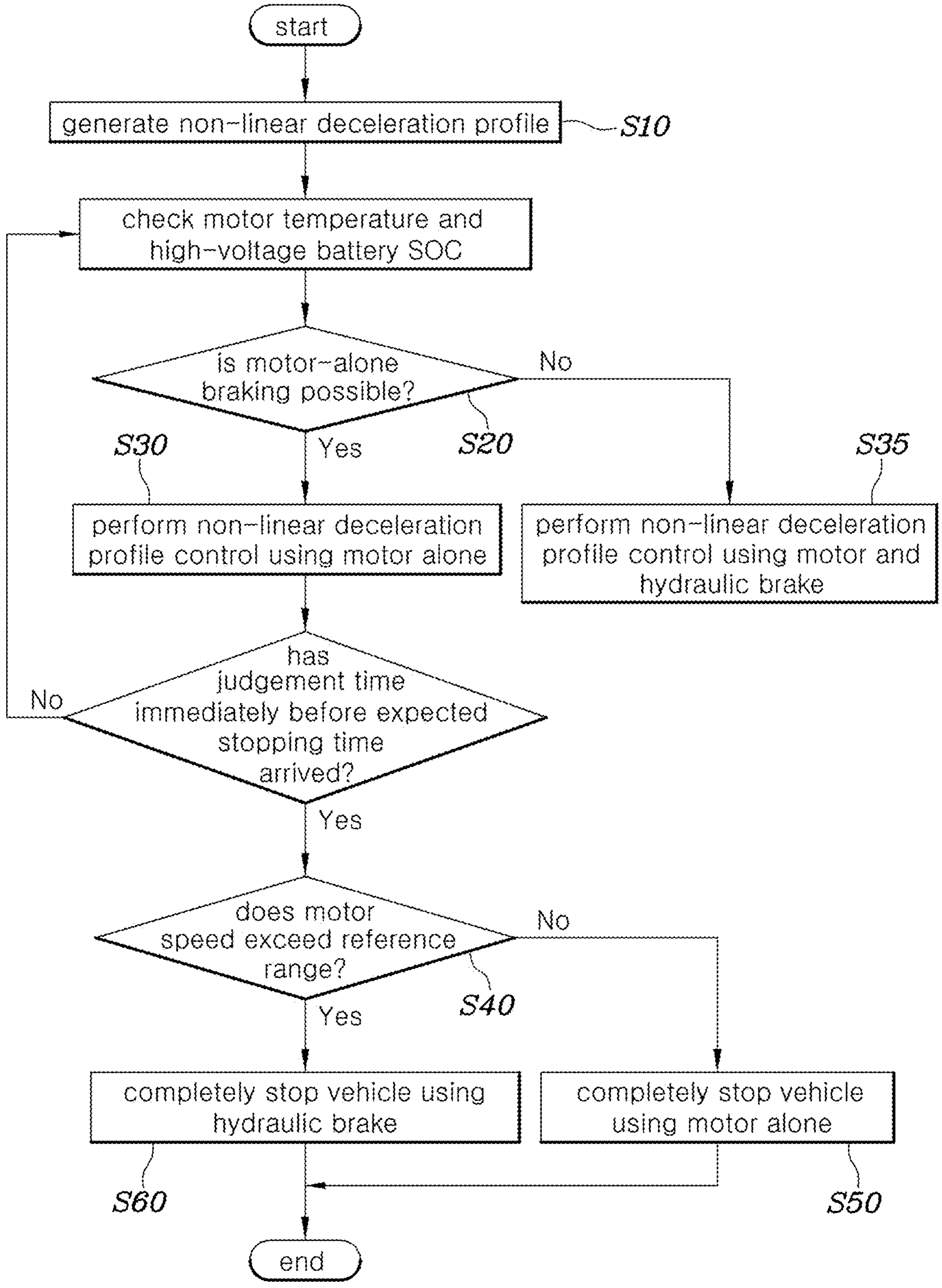
FIG. 1 is a flowchart showing an exemplary embodiment of a braking control method for electric vehicles according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the appended drawings. However, identical or similar components will be assigned the same reference numeral, and redundant descriptions thereof will be omitted.

The suffixes "module" and "unit" of elements herein are used for convenience of description and thus may be used interchangeably and do not have any distinguishable meanings or functions.

In the following description of the exemplary embodiments included in the present specification, a detailed description of known functions and configurations incorporated herein will be omitted when it may obscure the subject matter of the present disclosure. Furthermore, the accompanying drawings are provided only for case of understanding of the exemplary embodiments included in the present specification, do not limit the technical spirit included herein, and include all changes, equivalents and substitutes included in the spirit and scope of the present disclosure.

The terms "first" and/or "second" are used to describe various components, but such components are not limited by these terms. The terms are used to discriminate one component from another component.

When a component is "coupled" or "connected" to another component, it should be understood that a third component may be present between the two components although the component may be directly coupled or connected to the other component. When a component is "directly coupled" or "directly connected" to another component, it should be understood that no element is present between the two components.

An element described in the singular form is intended to include a plurality of elements unless the context clearly indicates otherwise.

In the present specification, it will be further understood that the term "comprise" or "include" specifies the presence of a stated feature, figure, step, operation, component, part or combination thereof, but does not preclude the presence or addition of one or more other features, figures, steps, operations, components, or combinations thereof.

Referring to FIG. 1, an exemplary embodiment of a braking control method for electric vehicles according to an exemplary embodiment of the present disclosure includes step S10 in which a control device 1 generates a non-linear deceleration profile NP for automatic braking, step S20 in which the control device 1 is configured to determine whether motor-alone braking is possible, step S30 in which the control device 1 is configured to perform braking of the vehicle according to the non-linear deceleration profile NP using a motor alone if motor-alone braking is possible, step S40 in which control device 1 is configured to determine whether a motor speed deviates from a motor speed target profile MTP by exceeding a predetermined reference range BR during a predetermined judgement time JT immediately before an expected stopping time T_STOP of a vehicle, and step S50 in which the control device 1 is configured to perform complete stopping of the vehicle, using the motor alone if the motor speed does not exceed the reference range BR.

Furthermore, the braking control method includes step S60 in which the control device 1 is configured to determine that longitudinal vibration of the vehicle occurs and is configured to perform complete stopping by operating a hydraulic brake if the motor speed deviates from the reference range BR.

As described above, automatic braking means automatically decelerating and stopping a vehicle without brake pedal operation by a driver, and the present disclosure is applied to a situation in which a smart cruise control device operates or a driver continuously operates a paddle shifter provided to control a regenerative braking stage of an electric vehicle so that the control device 1 automatically decelerates the vehicle to stop the vehicle without brake pedal operation.

The generated non-linear deceleration profile NP includes at least two deceleration sections in which the vehicle is caused to decelerate at a rate higher than a predetermined normal reference deceleration at the beginning of braking and to decelerate at a rate lower than the normal reference deceleration in the later stages of the braking based on a linear deceleration profile LP that causes the vehicle to uniformly linearly decelerate from a current vehicle speed to the predetermined normal reference deceleration to stop.

Figure 2:
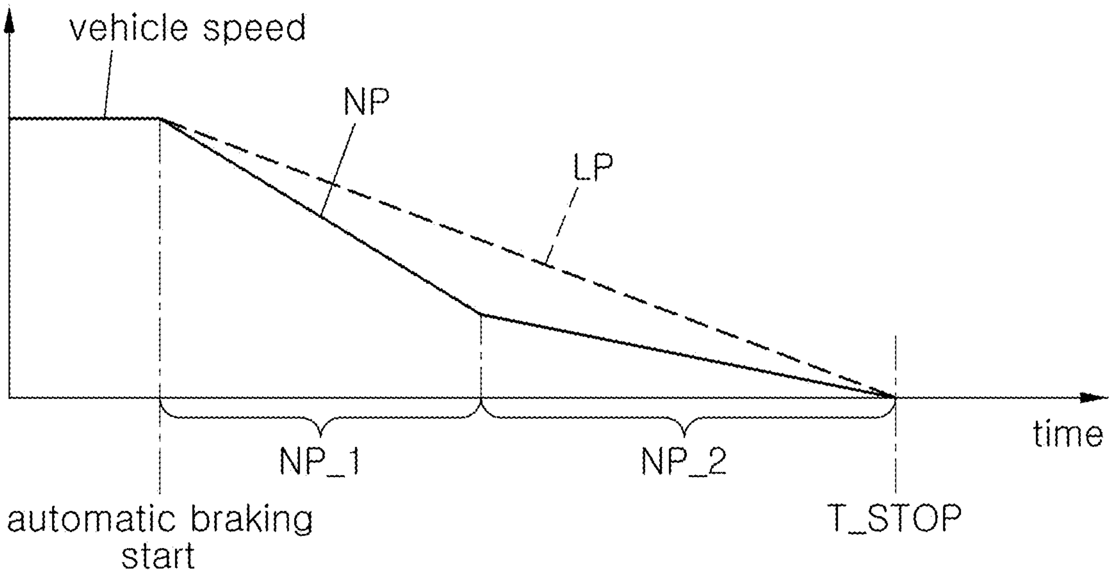
FIG. 2 is a diagram illustrating a non-linear deceleration profile used in an exemplary embodiment of the present disclosure.

That is, as illustrated in FIG. 2, based on the linear deceleration profile LP that causes the vehicle speed to linearly decrease at the normal reference deceleration from the time when automatic braking is started to an expected stopping of the vehicle movement time T_STOP, the non-linear deceleration profile NP is generated to be below the linear deceleration profile LP and includes a first deceleration section NP_1 in which the vehicle is caused to decelerate at a rate higher than the normal reference deceleration at the beginning of braking and a second deceleration section NP_2 in which the vehicle is caused to decelerate at a rate lower than the normal reference deceleration.

Although the first deceleration section NP_1 and the second deceleration section NP_2 are connected to form the non-linear deceleration profile in an exemplary embodiment of the present disclosure, there may be one or more sections with different decelerations therebetween.

Here, the normal reference deceleration is a gentle deceleration at which occupants do not feel discomfort by deceleration of the vehicle in a general situation other than sudden braking in an emergency situation due to an obstacle in front, and the like, and may be determined by being designed through a number of tests.

Therefore, when automatic braking is started, the control device 1 is configured to determine an expected stopping time of the vehicle using the current vehicle speed and the preset normal reference standard deceleration, and generates the non-linear deceleration profile NP based on the expected stopping time.

The second deceleration section NP_2 of the non-linear deceleration profile NP causes the vehicle to decelerate at a rate lower than the normal reference deceleration to enable smooth stopping without the use of a hydraulic brake if possible, and the first deceleration section NP_1 causes the vehicle to decelerate at a rate higher than the normal reference deceleration at the beginning of braking so that the same braking time is taken as in the case of deceleration with the linear deceleration profile LP according to the normal reference deceleration without excessive delay in the time to stop due to gentle deceleration in the second deceleration section NP_2 as described above.

The control device 1 is configured to determine whether motor-alone braking is possible in consideration of the motor temperature and the state of charge (SOC) value of a battery of the vehicle.

That is, the control device 1 is configured to determine that motor-alone braking is not possible when the motor temperature exceeds a predetermined upper limit temperature or the SOC value of the high-voltage battery exceeds a predetermined upper limit SoC.

Here, the upper limit temperature is set in consideration of a temperature at which, if the temperature of the motor rises any further, it becomes difficult to use the motor stably, such as motor performance deterioration or durability deteriorates, and may be determined by being designed according to a number of tests and analyses.

Furthermore, the upper limit SoC may be set to a level at which the high-voltage battery is already sufficiently charged and thus it may be determined that SoC increase due to additional regenerative braking is undesirable, and may be set by being designed to suit the vehicle through numerous tests and analyses.

Figure 3:
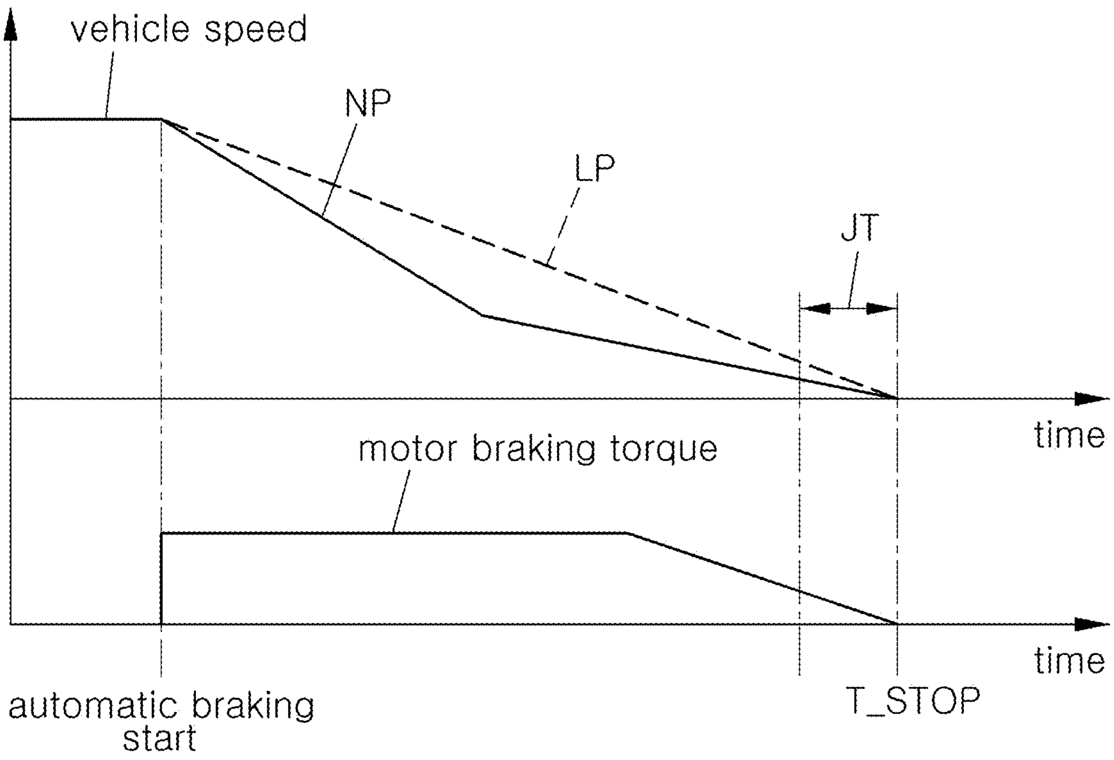
FIG. 3 is a graph illustrating braking using a motor alone when motor-alone braking is possible.

FIG. 3 is a diagram illustrating that, when motor-alone braking is possible, the control device 1 is configured to perform braking of the vehicle according to the non-linear deceleration profile NP using the motor alone.

Meanwhile, if motor-alone braking is not possible, the control device 1 is configured to perform braking of the vehicle according to the non-linear deceleration profile NP by operating the hydraulic brake along with the motor (S35).

Furthermore, if motor-alone braking is not possible, the control device 1 operates the hydraulic brake along with the motor at the beginning of braking for rapidly decelerating the vehicle at a rate higher than the normal reference deceleration.

Figure 4:
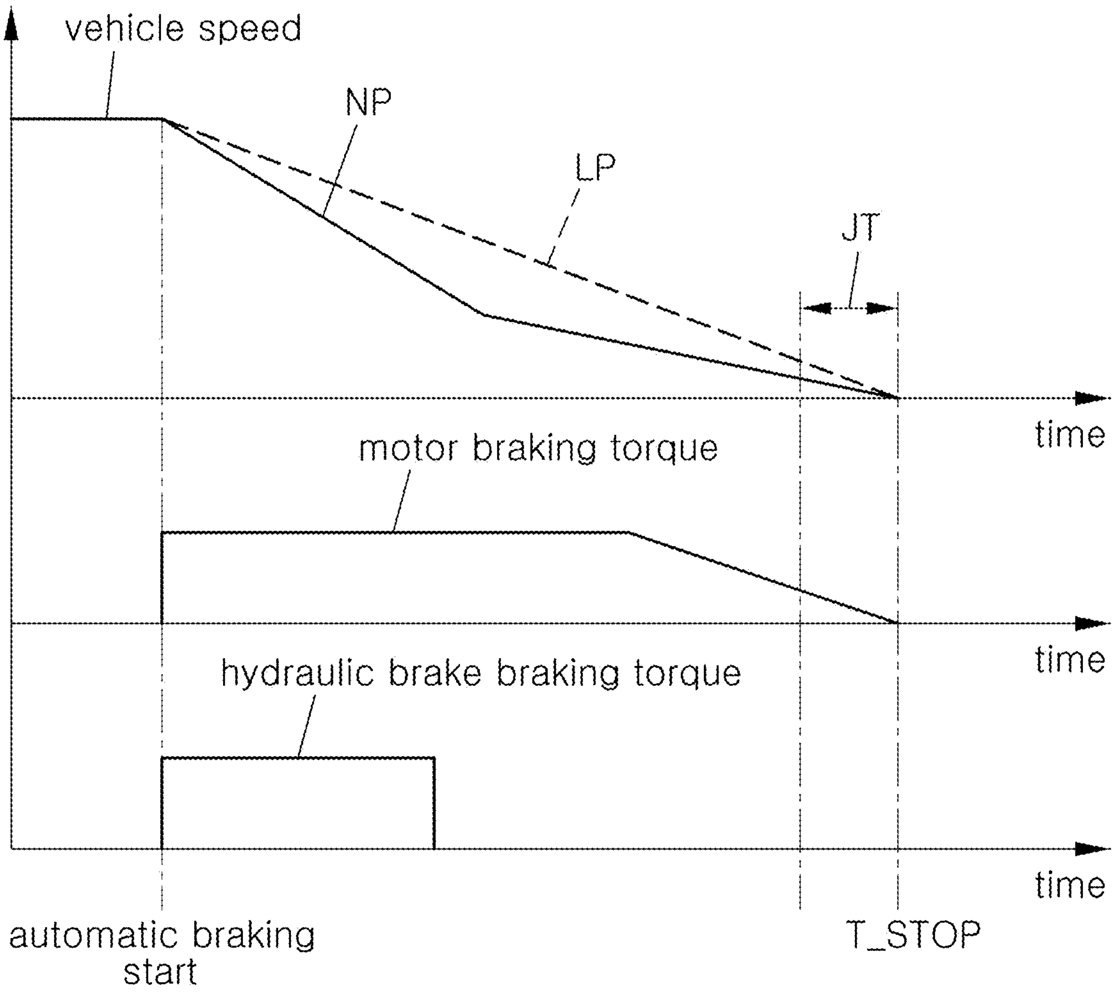
FIG. 4 is a graph illustrating braking using a motor and a hydraulic brake when motor-alone braking is not possible.

FIG. 4 illustrates an example in which the control device 1 operates the hydraulic brake along with the motor to perform braking of the vehicle according to the non-linear deceleration profile NP when motor-alone braking is not possible. The control device 1 is configured to perform rapid braking by operating the hydraulic brake only at the beginning of braking and stops the vehicle using only the motor in the later stage of braking, preventing vibration or shock caused by operation of the hydraulic brake near the vehicle stopping time.

Figure 5:
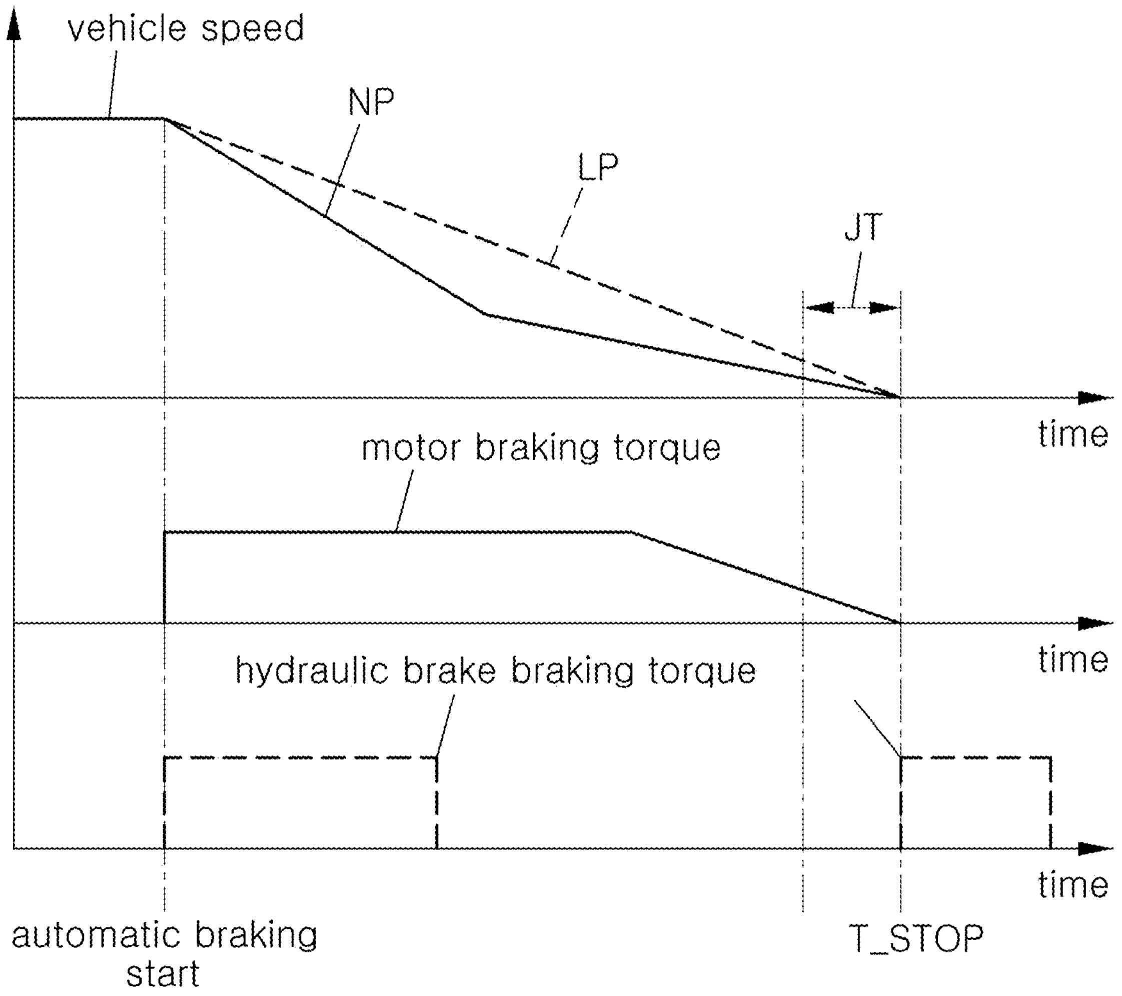
FIG. 5 is a graph showing a case in which complete stop is performed using a motor alone.

FIG. 5 illustrates a case in which the control device 1 is configured to perform complete stopping of the vehicle, using the motor alone because the motor speed does not exceed the reference range BR during the judgement time JT immediately before the expected stopping time T_STOP of the vehicle.

In the instant case, it is possible to prevent longitudinal vibration of the vehicle which may occur due to association of the braking operation with the hydraulic brake, improve the braking quality of the vehicle, and ultimately enhance the marketability of the vehicle.

Furthermore, in FIG. 5, dotted lines indicate that braking using the hydraulic brake may be performed. A hydraulic brake braking torque at the beginning of braking can enable the hydraulic brake to participate in braking along with the motor in a situation in which motor-alone braking is not possible, as described above, and a hydraulic brake braking torque at the time of stopping enables complete stopping with the hydraulic brake when the motor speed deviates from the reference range BR during the judgement time JT.

Here, the judgment time JT is set as a certain time interval immediately before the expected stopping time T_STOP, and refers to a time interval in which the vehicle is decelerated to almost stop but does not completely stop.

The judgment time JT may be set to, for example, within a few seconds. Considering the motor speed and the reference range BR, the judgement time JT may be determined by being designed through a number of tests and analyses to be suitable for determining whether to cause complete stopping of the vehicle, using the motor alone or to perform complete stopping of the vehicle, using the hydraulic brake to minimize the longitudinal vibration of the vehicle.

Figure 6:
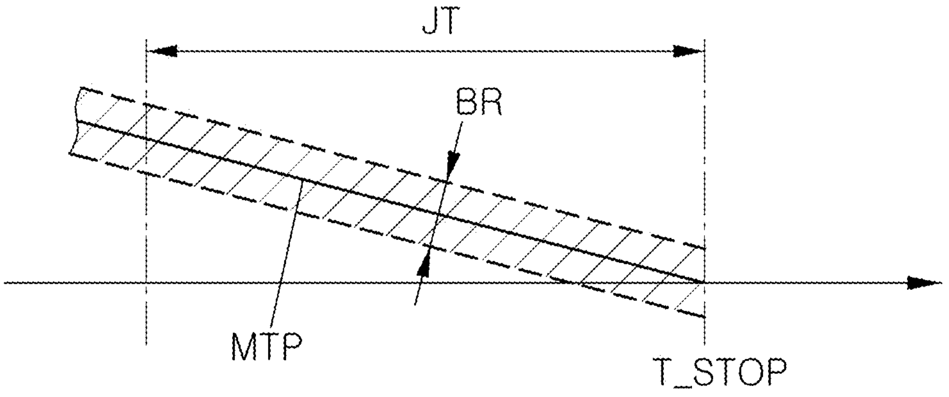
FIG. 6 is a diagram illustrating a reference range used in an exemplary embodiment of the present disclosure.

Furthermore, as illustrated in FIG. 6, the reference range BR may be set having a certain width up and down from the center corresponding to the motor speed target profile MTP according to the non-linear deceleration profile NP during the judgement time JT when the vehicle almost reaches a stopped state, and for example, may be set to a range of ±5% including the motor speed target profile MTP as a center so that the control device 1 causes the motor alone to completely stop the vehicle movement if the actual motor speed is within the reference range BR and operates the hydraulic brake to completely stop the vehicle if the actual motor speed deviates from the reference range BR.

The reference range BR may also be set to a level suitable for the vehicle in design through a number of tests and analyses.

Figure 7:
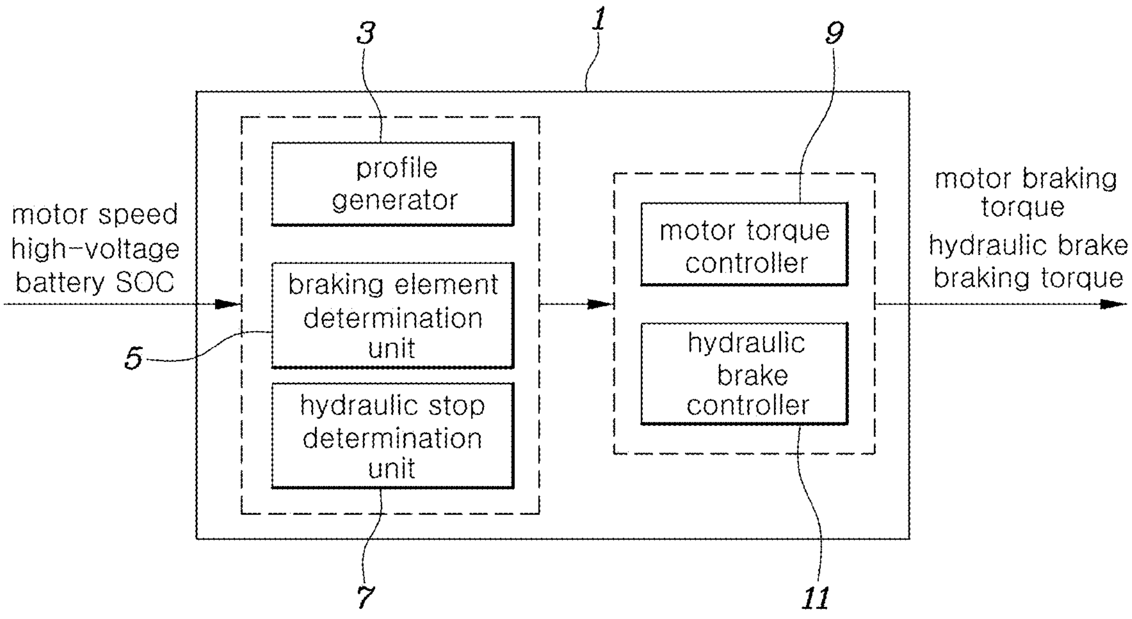
FIG. 7 is a diagram illustrating a configuration of a braking control device for electric vehicles according to an exemplary embodiment of the present disclosure.

Referring to FIG. 7, the braking control device 1 for electric vehicles which can perform the braking control method for electric vehicles according to an exemplary embodiment of the present disclosure as described above may be configured as follows.

That is, an exemplary embodiment of the braking control device 1 for electric vehicles according to an exemplary embodiment of the present disclosure includes a profile generator 3 that generates a non-linear deceleration profile NP for automatic braking, a braking element determination unit 5 that is configured to determine whether braking of the vehicle according to the non-linear deceleration profile NP may be performed by motor-alone braking, depending on the temperature of a motor and the SOC value of a battery of the vehicle, a hydraulic stop determination unit 7 that is configured to determine whether to perform complete stopping of the vehicle, using a hydraulic brake, depending on whether longitudinal vibration of a vehicle occurs during a predetermined judgement time JT immediately before an expected stopping time of the vehicle, and a motor torque controller 9 and a hydraulic brake controller 11 that perform braking of the vehicle according to determination of the braking element determination unit 5 and the hydraulic stop determination unit 7.

The profile generator 3 is configured to generate the non-linear deceleration profile NP including at least two deceleration sections in which the vehicle is caused to decelerate at a rate higher than a predetermined normal reference deceleration at the beginning of braking and to decelerate at a rate lower than the normal reference deceleration in the later stages of the braking based on a linear deceleration profile LP that causes the vehicle to uniformly linearly decelerate from the current vehicle speed to the predetermined normal reference deceleration to stop.

The non-linear deceleration profile NP includes a first deceleration section NP_1 in which the vehicle is caused to decelerate at a rate higher than the normal reference deceleration, and a second deceleration section NP_2 in which the vehicle is caused to decelerate at a rate lower than the normal reference deceleration, which are connected to each other.

The braking element determination unit 5 is configured to determine that motor-alone braking is not possible if the temperature of the motor exceeds a predetermined upper limit temperature or the SOC value of the high-voltage battery exceeds a predetermined upper limit SOC value and to determine that motor-alone braking is possible if the temperature of the motor is equal to or lower than the upper limit temperature and the SOC value of the high-voltage battery is less than or equal to the upper limit SoC.

The motor torque controller 9 is configured to perform braking of the vehicle according to the non-linear deceleration profile NP only with the motor when the braking element determination unit 5 determines that motor-alone braking is possible.

The hydraulic brake controller 11 is configured to control the hydraulic brake in addition to the braking using the motor by the motor torque controller 9 to achieve braking of the vehicle according to the non-linear deceleration profile NP when the braking element determination unit 5 determines that motor-alone braking is not possible.

Furthermore, the hydraulic brake controller 11 is configured to operate the hydraulic brake at the beginning of braking to decelerate the vehicle at a rate higher than the normal reference deceleration when the braking element determination unit 5 determines that motor-alone braking is not possible.

The hydraulic stop determination unit 7 is configured to determine that longitudinal vibration of the vehicle occurs when the motor speed deviates from the reference range BR.

The hydraulic brake controller 11 may be configured to operate the hydraulic brake to completely stop the vehicle when the hydraulic stop determination unit 7 determines that the longitudinal vibration of the vehicle occurs.

According to an exemplary embodiment of the present disclosure, each of the profile generator 3, the braking element determination unit 5, the hydraulic stop determination unit 7, the motor torque controller 9 and the hydraulic brake controller 11 implemented by a processor (e.g., computer, microprocessor, CPU. ASIC, circuitry, logic circuits, etc.). Alternatively, the profile generator 3, the braking element determination unit 5, the hydraulic stop determination unit 7, the motor torque controller 9 and the hydraulic brake controller 11 may be integrated in a single processor.

Figure 8:
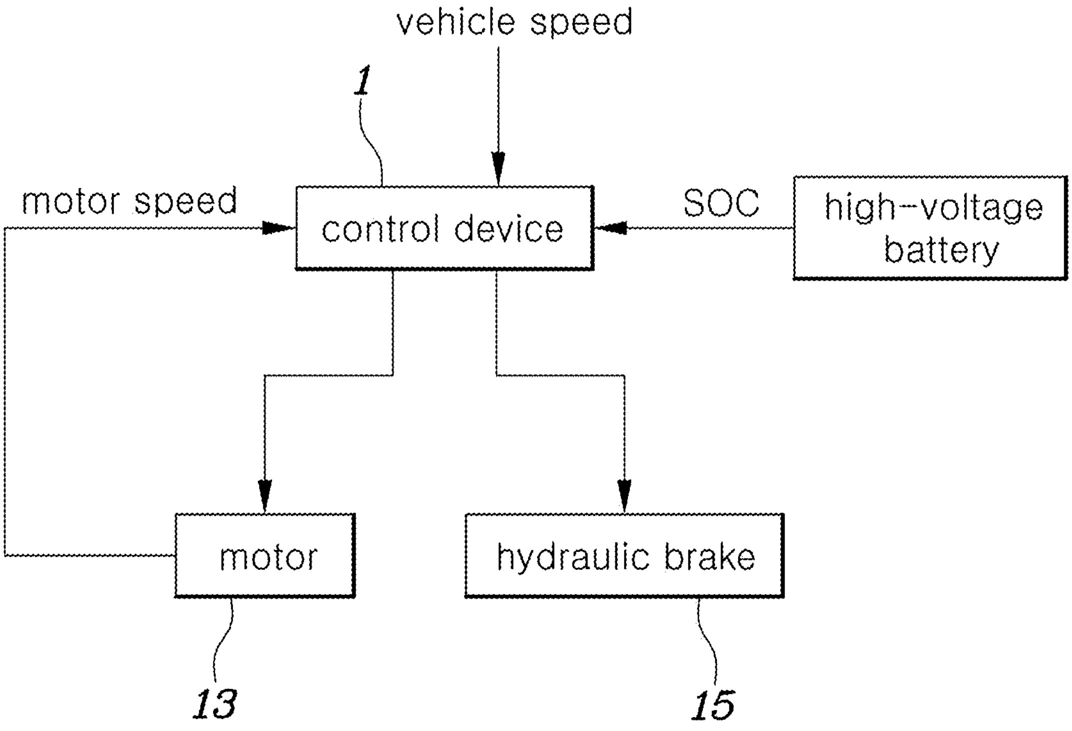
FIG. 8 is a schematic diagram of a vehicle provided with the braking control device for electric vehicles according to an exemplary embodiment of the present disclosure.

For reference, FIG. 8 is a schematic diagram of an electric vehicle provided with the control device of the present disclosure as described above. The control device 1 is configured to receive a vehicle speed, a motor speed, the SOC value of a battery of the vehicle, and the like by using corresponding sensors such as a vehicle speed sensor, a motor speed sensor, and a battery management unit, and to control a motor 13 and a hydraulic brake 15 of the vehicle.

The present disclosure can improve the braking quality of an electric vehicle and ultimately improve the marketability of the electric vehicle by minimizing longitudinal vibration of the electric vehicle which may occur due to association of a braking operation with a hydraulic brake during automatic braking of the electric vehicle.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A braking control method for a vehicle, the braking control method comprising:

generating, by a control device, a non-linear deceleration profile for automatic braking operation of the vehicle;

determining, by the control device, whether motor-alone braking is possible according to a motor temperature and a state of charge (SOC) value of a battery of the vehicle;

performing braking of the vehicle according to the non-linear deceleration profile, by the control device, using a motor alone in response to a determination that the motor-alone braking is possible;

determining, by the control device, whether a motor speed deviates from a predetermined reference range centered on a motor speed target profile according to the non-linear deceleration profile during a predetermined judgement time before an expected stopping time of the vehicle; and completely stopping the vehicle, by the control device, using the motor alone in response to a determination that the motor speed does not deviate from the predetermined reference range.

2. The braking control method of claim 1, further including determining, by the control device, that longitudinal vibration of the vehicle occurs based on the motor speed deviating from the predetermined reference range, and operating a hydraulic brake to completely stop the vehicle, in response to a determination that the longitudinal vibration occurs.

3. The braking control method of claim 2, wherein the non-linear deceleration profile includes at least two deceleration sections in which the vehicle is caused to decelerate at a first rate higher than a predetermined normal reference deceleration at beginning of the braking and to decelerate at a second rate lower than the predetermined normal reference deceleration in later stages of the braking based on a linear deceleration profile for causing the vehicle to uniformly linearly decelerate from a current vehicle speed according to the predetermined normal reference deceleration until stopping.

4. The braking control method of claim 3, wherein the at least two deceleration sections of the non-linear deceleration profile includes a first deceleration section in which the vehicle is caused to decelerate at the first rate higher than the normal reference deceleration, and a second deceleration section in which the vehicle is caused to decelerate at the second rate lower than the normal reference deceleration, the first deceleration section and the second deceleration section being connected to each other.

5. The braking control method of claim 3, wherein the control device is configured to operate the hydraulic brake along with the motor to perform the braking of the vehicle according to the non-linear deceleration profile in response to a determination that the motor-alone braking is not possible.

6. The braking control method of claim 5, wherein the control device is configured to operate the hydraulic brake along with the motor at the beginning of the braking of the vehicle to decelerate the vehicle at a rate higher than the predetermined normal reference deceleration in response to a determination that the motor-alone braking is not possible.

7. The braking control method of claim 2, wherein the control device is configured to determine that the motor-alone braking is not possible in response to a determination that the motor temperature exceeds a predetermined upper limit temperature or the SOC value of the battery exceeds a predetermined upper limit SOC value.

8. A braking control apparatus for a vehicle, the braking control apparatus comprising:

a profile generator configured to generate a non-linear deceleration profile for automatic braking operation of the vehicle;

a braking element determination unit configured to determine whether braking of the vehicle according to the non-linear deceleration profile is able to be performed by motor-alone braking, depending on a temperature of a motor of the vehicle and an SOC value of a battery of the vehicle;

a hydraulic stop determination unit configured to determine whether to perform complete stopping of the vehicle, using a hydraulic brake, depending on whether longitudinal vibration of the vehicle occurs by determining whether a motor speed deviates from a reference range centered on a motor speed target profile according to the non-linear deceleration profile during a predetermined judgement time before an expected stopping time of the vehicle; and a motor torque controller and a hydraulic brake controller configured to perform the automatic braking of the vehicle according to the determinations of the braking element determination unit and the hydraulic stop determination unit, wherein the hydraulic brake controller is configured to operate the hydraulic brake to completely stop the vehicle in response to a determination by the hydraulic stop determination unit that the motor speed deviates from the reference range.

9. The braking control apparatus of claim 8, wherein the profile generator is configured to generate the non-linear deceleration profile including at least two deceleration sections in which the vehicle is caused to decelerate at a first rate higher than a predetermined normal reference deceleration at beginning of the braking and to decelerate at a second rate lower than the predetermined normal reference deceleration in later stages of the braking based on a linear deceleration profile (LP) that causes the vehicle to uniformly linearly decelerate from a current vehicle speed according to the predetermined normal reference deceleration until stopping.

10. The braking control apparatus of claim 9, wherein the at least two deceleration sections of the non-linear deceleration profile includes a first deceleration section in which the vehicle is caused to decelerate at the first rate higher than the normal reference deceleration, and a second deceleration section in which the vehicle is caused to decelerate at the second rate lower than the normal reference deceleration, the first deceleration section and the second deceleration section being connected to each other.

11. The braking control apparatus of claim 9, wherein the braking element determination unit is configured to determine that the motor-alone braking is not possible in response to a determination that the temperature of the motor exceeds a predetermined upper limit temperature or the SOC value of the battery exceeds a predetermined upper limit SOC value and to determine that the motor-alone braking is possible when the temperature of the motor is equal to or lower than the upper limit temperature and the SOC value of the battery is less than or equal to the upper limit SOC value.

12. The braking control apparatus of claim 11, wherein the motor torque controller is configured to perform the braking of the vehicle according to the non-linear deceleration profile only with the motor when the braking element determination unit determines that the motor-alone braking is possible.

13. The braking control apparatus of claim 12, wherein the hydraulic brake controller is configured to control the hydraulic brake in addition to the braking using the motor by the motor torque controller to achieve the braking of the vehicle according to the non-linear deceleration profile when the braking element determination unit determines that the motor-alone braking is not possible.

14. The braking control apparatus of claim 13, wherein the hydraulic brake controller is configured to operate the hydraulic brake at the beginning of the braking to decelerate the vehicle at a rate higher than the predetermined normal reference deceleration when the braking element determination unit determines that the motor-alone braking is not possible.

* * * * *